United States Patent [19]

Jorgensen et al.

[11] Patent Number: 4,694,848

[45] Date of Patent: Sep. 22, 1987

[54] FLOW CONTROL VALVE

[76] Inventors: Walter E. Jorgensen, 815 Columbia St., So., Pasadena, Calif. 91030; Robert L. Linquist, 11851 Melody Park Dr., Garden Grove, Calif. 92640

[21] Appl. No.: 790,956

[22] Filed: Oct. 24, 1985

[51] Int. Cl.⁴ .......................................... F16K 31/126
[52] U.S. Cl. ..................... 137/114; 137/312; 137/625.4; 137/625.5; 251/61.3; 251/335.2
[58] Field of Search ............. 251/61, 61.1, 61.2, 251/61.3, 61.4, 61.5, 335.1, 335.2; 92/48, 5 R, 97, 98 R, 98 D; 91/509; 137/625.5, 312, 114, 625.4

[56] References Cited

U.S. PATENT DOCUMENTS

| | | | |
|---|---|---|---|
| 549,407 | 11/1895 | Vail | 92/97 X |
| 1,539,630 | 5/1925 | Beaird | 251/61.3 X |
| 2,770,799 | 11/1956 | Horn | 92/5 R X |
| 2,897,836 | 8/1959 | Peters et al. | 137/625.5 X |
| 3,047,003 | 7/1962 | Gurney | 137/114 X |
| 3,212,525 | 10/1965 | Henderson | 137/114 X |
| 3,762,430 | 11/1973 | Maercklein | 251/61.3 X |
| 4,506,694 | 3/1985 | Daghe et al. | 137/218 |
| 4,615,353 | 10/1986 | McKee | 251/61.2 X |

OTHER PUBLICATIONS

Beard, Chester S., "Final Control Elements: Valves and Actuators", pp. 234, 235.

Primary Examiner—Gerald A. Michalsky
Attorney, Agent, or Firm—Fulwider, Patton, Rieber, Lee & Utecht

[57] ABSTRACT

A direct acting flow control valve operative by an actuator responsive to fluid pressure from an external source. The actuator includes a pair of spaced apart pistons and associated rolling diaphragms which define an actuator chamber into which the fluid pressure is admitted, and a separate leakage chamber into which fluid will pass on leaking through a defective diaphragm, the leakage chamber being adapted for communication with an external indicator, shutoff valve or the like.

4 Claims, 2 Drawing Figures

FLOW CONTROL VALVE

BACKGROUND OF THE INVENTION

1. Field of the Invention:

The present invention relates to a direct acting flow control valve using rolling diaphragms.

2. Description of the Prior Art:

The present flow control valve has particular application in the regulation of water flow through a condenser operating in a refrigeration system. Where the flow is relatively low a smaller valve can be used which typically employs a piston and bellows assembly movable in response to refrigerant pressure applied to the valve. Such valve bellows are made of stainless steel or other metallic material for corrosion resistance, and consequently they are relatively expensive and sometimes prone to fatigue failure. This type of valve cannot accommodate large flow rates because it does not have a sufficiently great longitudinal excursion or movement.

The typical larger valve for higher flows utilizes an indirect valve actuation system. A so-called pilot valve is used which incorporates a metal bellows responsive to fluid pressure. This applies pressure to the main valve through an arrangement of narrow pilot passages. The small longitudinal excursion or movement of the pilot valve is multiplied by the system, but the pilot passages are very susceptible to clogging with sediment and foreign matter, particularly in a marine system for regulating the flow of seawater.

SUMMARY OF THE INVENTION

The flow control valve of the present invention employs a nonmetallic, elastomeric bellows which is operative to provide the desired longer excursion of movement necessary to control large water flows in a direct acting arrangement.

The flow control valve comprises a valve body, a valve means for throttling a flow of fluid through the valve body, and bias means normally operative upon the valve means to bias the valve means to a closed position.

The actuator for the valve means includes a pair of pistons and associated rolling diaphragms which are spaced apart to define an upper or outer actuator chamber adapted for communication with a source of fluid pressure, such as refrigerant pressure, and a separate leakage chamber to serve the important function of receiving any fluid leaking from the actuator chamber through the first or upper rolling diaphragm. The leakage chamber is adapted for communication with an external indicator or shutoff valve so that the leakage can be brought to the attention of the system operator, while the second diaphragm assumes a backup role to enable the system to continue to function despite the leakage.

The nonmetallic character and manner of operation of the rolling diaphragms provides a long and reliable service life, as well as providing the desired longer longitudinal movement. The backup operation is important in the event of a failure of the first or primary diaphragm.

Other objects and features of the invention will become apparent from consideration of the following description taken in connection with the accompanying drawings.

DESCRIPTION OF THE PREFERRED EMBODIMENTS

Figure 1:
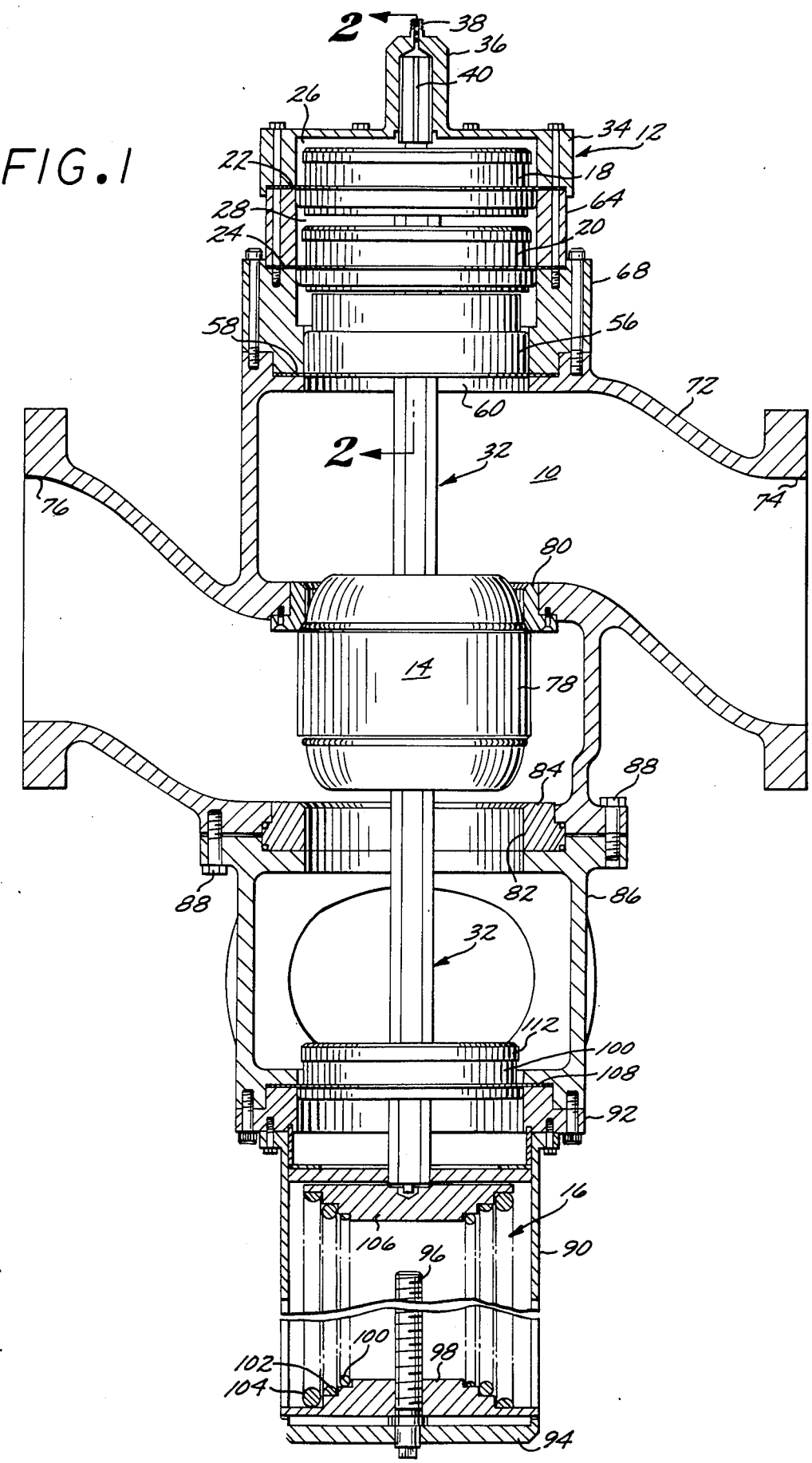
FIG. 1 is a longitudinal cross sectional view of a balanced direct acting mixing water regulating valve of the present invention, illustrated as it would be used in a marine service refrigeration system.
Figure 2:
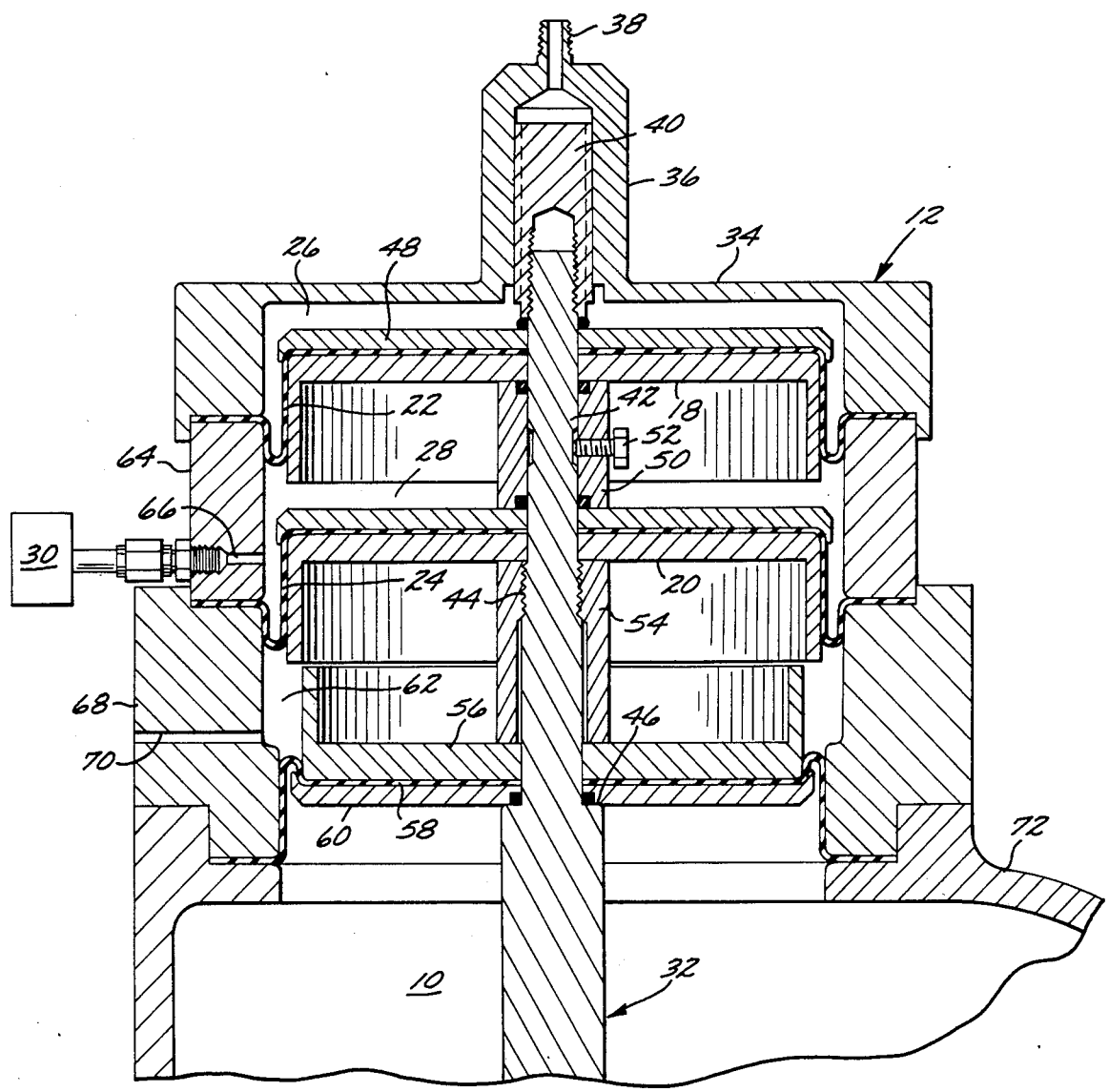
FIG. 2 is an enlarged cross sectional view taken along the line 2—2 of FIG. 1.

Referring now to the drawings, there is illustrated a balanced direct acting flow control valve according to the present invention and comprising, generally, a valve body 10 having an upper housing 12; a valve assembly 14 movable in the valve body 10 for throttling a flow of controlled fluid through the valve body 10; a bias means 16 operative upon the valve assembly 14 to bias the valve assembly 14 in a first or upper direction; actuator piston means including first and second actuator pistons 18 and 20; first and second rolling diaphragms 22 and 24 carried by the pistons 18 and 20, respectively, and fixed to the upper housing 12 in spaced apart relation to define an upper or primary actuator chamber 26 adapted for communication with a source of control fluid pressure, and further defining a leakage chamber 28 between the diaphragms 22 and 24 adapted for communication with response means 30, as seen in FIG. 2. The means 30 is responsive to control fluid leaking from the actuator chamber 26, through the first diaphragm 22, and into the leakage chamber 28. The flow control valve further comprises a valve stem assembly 32 for coupling the pistons 18 and 20 to the valve assembly 14 to move the valve assembly downwardly in response to a pressure head developed in the actuator chamber 26.

The valve body 10 includes a cylindrical upper portion 34 having a depending flange defining the actuator chamber 26. The upper portion 34 is integral with a centrally bored, upwardly disposed projection 36 having a threaded inlet 38 for connection to a source of refrigerant pressure.

The valve stem assembly 32 includes a shaft or push rod 40 which is provided with axial channels to enable control fluid such as refrigerant to flow from the inlet 38 into the actuator chamber 26. The push rod 40 serves as a guide for movement of the valve stem assembly 32 and it includes an internally threaded bore which is threaded to the upper extremity of an upper valve stem 42 having an intermediate threaded portion 44 and a larger diameter portion defining a shoulder 46.

The upper piston 18 and associated diaphragm 22 are centrally apertured to receive the upper valve stem 42. A centrally apertured disk or retainer 48 overlies the diaphragm 22 and a cylindrical spacer 50 is disposed upon the upper valve stem 42 in underlying relation to the piston 18, separating the two piston assemblies, as best seen in FIG. 2. This arrangement, together with suitable O-rings, as illustrated, provides a fluid tight seal between the spacer 50, the upper valve stem 42, the piston 18, and the lower extremity of the push rod 40 to isolate the chambers 26 and 28 from each other.

The construction of the lower piston 20 is similar to that of the piston 18, including a cylindrical spacer 54 threaded to the portion 44 of the upper valve stem 42, and engagable with a piston 20 at its upper end and with a third piston 56 which is axially spaced below the piston 20.

The piston 56 is inverted, compared to pistons 18 and 20, and its lower or closed end mounts a third rolling diaphragm 58 which is held in position by a retainer 60 seated against the valve stem shoulder 46 in a fluid tight relation by virtue of the presence of the O-ring illustrated. An auxiliary chamber 62 is defined between the axially spaced apart rolling diaphragms 24 and 58.

The radially projecting portion of the annular skirt of the upper diaphragm 22 is held or captured between the base of the annular flange of the upper housing portion 34 and the upper surface of an annular cylinder 64. The cylinder 64 includes a radial opening 66 and an associated fitting to provide communication between the leakage chamber 28 and the response system 30.

The radially extending portion of the second diaphragm 24 is captured or held between the lower surface of the cylinder 64 and the upper surface of a lower cylinder 68 having a vent passageway 70 adapted to provide communication between the auxiliary chamber 62 and the outside of the flow control valve.

The valve body 10 includes a main body 72 which is secured to the lower cylinder 68 to capture and retain the radially extending portion of the lowermost diaphragm 58. The main body 72 is in communication with the underside of the lowermost piston 60 and includes internal passages defining an inlet conduit 74 and an outlet conduit 76 in communication when the throttle plug 78 carried by the valve stem assembly 32 is unseated from an annular seat 80 carried by the main body 72.

The main body 72 defines a bypass conduit 82 which is closed when the throttle plug 78 seats against an annular seat 84 carried by the main body 72.

The valve body 10 also includes a body 86 which is in communication with the bypass conduit 82, and which is attached to the lower extremity of the main body 72 by usual cap screws 88. The body 86 is a three way body, but the present invention is not limited to such a three way arrangement. Other arrangements, including a two way body may be used, the body 86 being merely exemplary of one arrangement for bypassing fluid or water when the throttle plug 78 is out of engagement with the upper seat 80. The open lower end of the three way body 86 is closed by a rolling diaphragm 108 captured between the body 86 and the cylinder retainer 92. The diaphragm 108 is held in a piston 110 by a retainer 112, the piston 110, in turn, being fixed to the lower extremity of the valve stem assembly 32.

The material of which all of the diaphragms are made is nonmetallic, preferably being an elastomeric substance such as the material manufactured by Dupont and known as "Hypalon", or the material known as "Dacron" synthetic rubber or the like.

The valve body 10 further includes a lower portion constituting a cylindrical spring housing 90 secured at its upper end to an annular cylinder retainer 92 secured to the lower end of the three way body 86. The lower end of the spring housing 90 is closed by a wall 94 which carries a central, axially directed threaded rod 96 which mounts a fixed spring plate 98.

The plate 98 includes annular shoulder or steps mounting, respectively, coaxially arranged compression springs 100, 102 and 104 whose upper extremities are engaged upon similar or complemental annular shoulders formed in a movable spring plate 106 which bears against the lower end of the valve stem assembly 32.

As previously indicated, the present valve is particularly adapted for use as a direct acting, refrigerant pressure actuated water flow control valve. It modulates the flow of water through the associated condenser by modulating the flow of controlled fluid or water from the inlet conduit 74 to the outlet conduit 76 in response to changes in the control fluid or refrigerant pressure applied at the upper inlet 38.

When refrigerant pressure increases, the increased pressure in the actuator chamber 26 develops a force upon the upper piston 18 which moves it and the associated pistons 20 and 56 and movable spring plate 106 against the bias of the springs 100, 102 and 104.

As the throttling plug 78 moves downwardly off the seat 80, the throttle plug 78 eventually reaches a position of equilibrium determined by the water flow and the related refrigerant pressure.

When the refrigerant pressure decreases, the opposite of the foregoing operation results, the bias of the springs 100, 102 and 104 tending to move the throttle plug 78 toward the seat 80. The feedback action of the springs causes the throttle plug 78 to hold a position proportional to the refrigerant pressure, and results in a very stable control valve which allows only that flow necessary for efficient operation.

The present valve is a balanced valve in that the valve assembly 14 is balanced by piston 56, diaphragm 58 and retainer 60, and by diaphragm 108, piston 110 and retainer 112.

In the event a leak occurs in the upper diaphragm 22, the valve does not cease to operate. The pressure necessary for movement of the actuator pistons will now be developed in the leakage chamber 28. This is an important feature of the invention in that there is always a backup system in the event of such failure. This prevents escape of hazardous freon or other actuating fluid into the atmosphere or into closed machinery compartments.

The response system 30 can be an external display or an automatic shutoff valve, as desired, so that leakage into the chamber 28 is detected and corrective action taken immediately.

The present flow control valve reduces the maintenance involved in prior art pilot operated valves, and eliminates all problems of pilot passage clogging. It also reduces the number of parts exposed to sea water. The backup diaphragm arrangement enables secondary containment of refrigerant, relatively fast response time, and desirably improves the degree of available longitudinal excursion for handling relatively large water flow.

Various modifications and changes may be made with regard to the foregoing detailed description without departing from the spirit of the invention.

We claim:
1. A direct acting flow control valve comprising:
  a valve body;
  valve means movable in said valve body for throttling a flow of fluid through said valve body;
  bias means operative upon said valve means for biasing said valve means in a first direction;
  first actuator means coupled to said valve means and including first rolling diaphragm means fixed to said valve body for defining an actuator chamber, and for operating said valve means in a direction opposite said first direction in response to an operating fluid pressure developed in said actuator chamber;
  means for admitting fluid to said actuator chamber for developing said operating fluid pressure;

second actuator means coupled to said valve means and including second rolling diaphragm means fixed to said valve body in spaced relation to said first rolling diaphragm means for defining a leakage chamber for retaining any fluid leaking past said first rolling diaphragm means as a consequence of a failure of said first rolling diaphragm means, said second rolling diaphragm means having the same dimensions and configuration as said first rolling diaphragm means whereby, upon any failure of said first rolling diaphragm means, said second rolling diaphragm means is adapted for operating said valve means in a manner identical to that of said first rolling diaphragm means;

response means for sensing the development of said operating fluid pressure in said leakage chamber upon leakage of fluid past said first rolling diaphragm means and into said leakage chamber;

third actuator means coupled to said valve means in spaced relation to said second actuator means for movement in said first direction in response to a pressure head developed in said valve body by said flow of fluid through said valve body, and for isolating said second actuator means from said flow of fluid; and vent means for venting to atmosphere the space between said second actuator means and said third actuator means.

2. A direct acting control valve according to claim 1 wherein said first and second rolling diaphragm means are made of nonmetallic flexible material.

3. A direct acting flow control valve comprising:
valve body means having a control fluid inlet opening, a control fluid leakage opening, and fluid passage means for a controlled fluid;

valve means movable in said valve body means for throttling a flow of controlled fluid through said fluid passage means;

bias means operative upon said valve means for biasing said valve means in a first direction;

first actuator means coupled to said valve means and including first rolling diaphragm means fixed to said valve body means for defining an actuator chamber, and for operating said valve means in a direction opposite said first direction in response to an operating fluid pressure developed in said actuator chamber;

means for admitting fluid to said actuator chamber through said control fluid inlet opening for developing said operating fluid pressure;

second actuator means coupled to said valve means and including second rolling diaphragm means fixed to said valve body means in spaced relation to said first rolling diaphragm means for defining a leakage chamber for communication with said control fluid leakage opening and for retaining any fluid leaking past said first rolling diaphragm means as a consequence of a failure of said first rolling diaphragm means, said second rolling diaphragm means having the same dimensions and configuration as said first rolling diaphragm means whereby, upon any failure of said first rolling diaphragm means, said second rolling diaphragm means is adapted for operating said valve means in a manner identical to that of said first rolling diaphragm means;

response means in communication with said control fluid leakage opening for sensing the development of said operating fluid pressure in said leakage chamber upon leakage of fluid into said leakage chamber; and balance means exposed to the pressure head in said fluid passage means and cooperating with said valve body means for isolating said second rolling diaphragm means from controlled fluid flowing through said fluid passage means, and for defining an auxiliary chamber between said balance means and said second rolling diaphragm means, said auxiliary chamber having a vent opening to atmosphere.

4. A direct acting control valve according to claim 3 wherein said balance means comprises a rolling diaphragm fixed to said valve body means and defining said auxiliary chamber.

* * * * *